March 1, 1966  A. U. BRYANT  3,237,916
DISC VALVE

Filed Oct. 2, 1963

INVENTOR.
AUSTIN U. BRYANT
BY Edward B Gregg
ATTORNEY

March 1, 1966
A. U. BRYANT
3,237,916
DISC VALVE
Filed Oct. 2, 1963
6 Sheets-Sheet 2
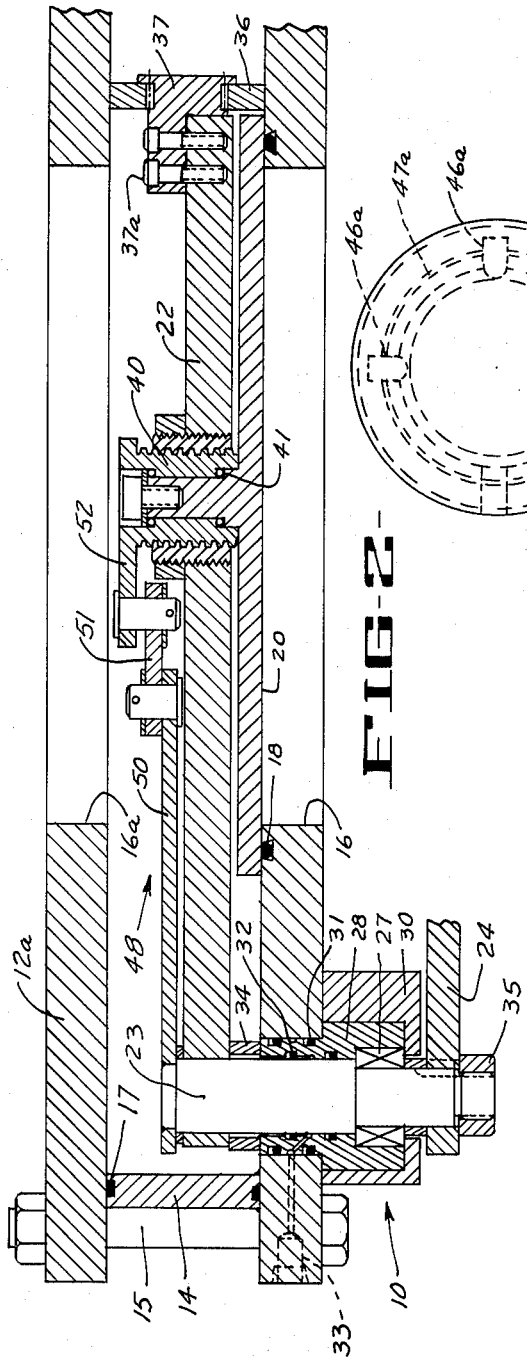
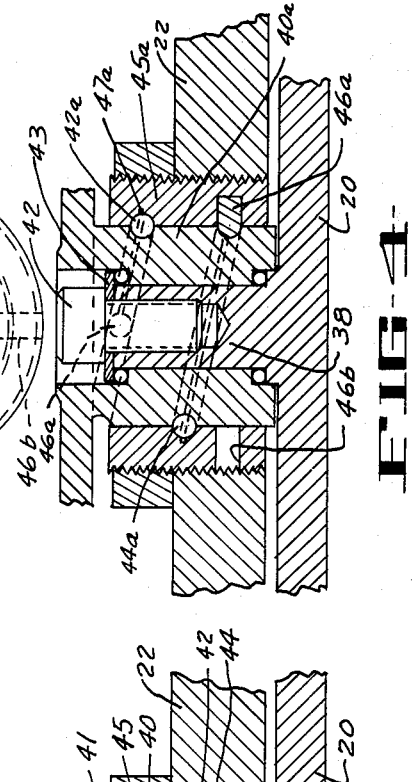
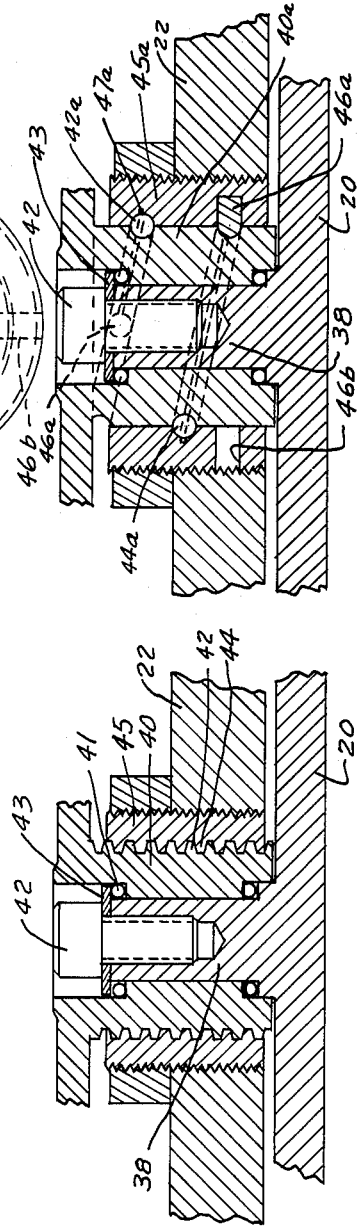
INVENTOR.
AUSTIN U. BRYANT
BY Edward B Gregg
ATTORNEY March 1, 1966 A. U. BRYANT 3,237,916
DISC VALVE
Filed Oct. 2, 1963 6 Sheets-Sheet 3
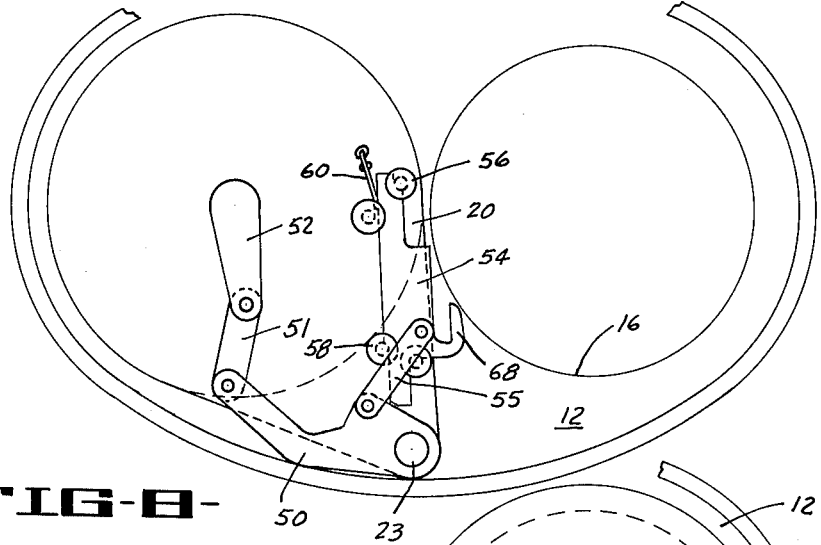
FIG-8-
FIG-7-
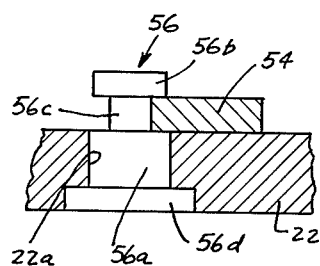
FIG-9-
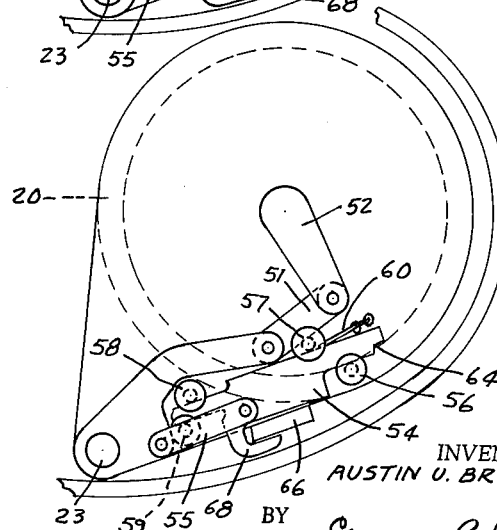
FIG-6-
INVENTOR.
AUSTIN U. BRYANT
BY Edward B Gregg
ATTORNEY INVENTOR.
AUSTIN U. BRYANT
BY Edward B Gregg
ATTORNEY March 1, 1966  A. U. BRYANT  3,237,916
DISC VALVE
Filed Oct. 2, 1963  6 Sheets-Sheet 5
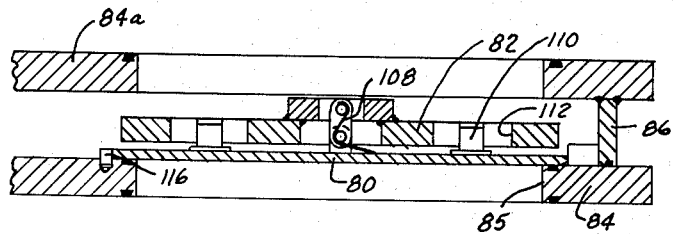
FIG 14-
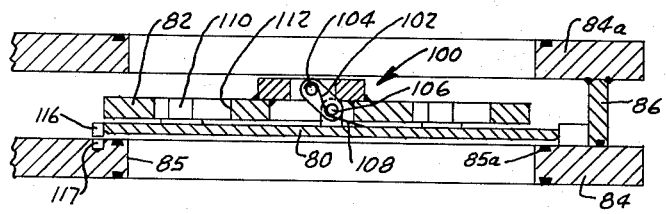
FIG 13-
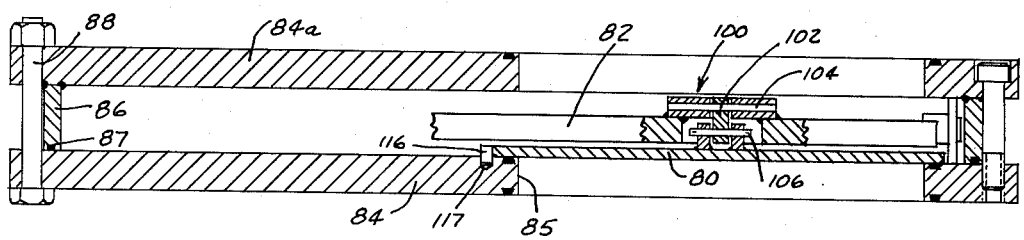
FIG 12-
INVENTOR.
AUSTIN U. BRYANT
BY Edward B Gregg
ATTORNEY

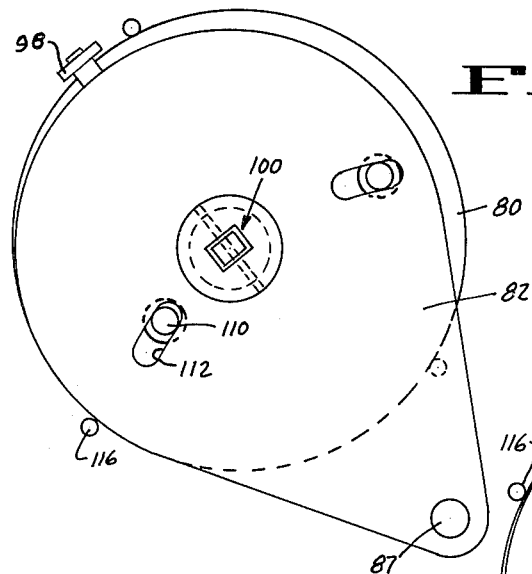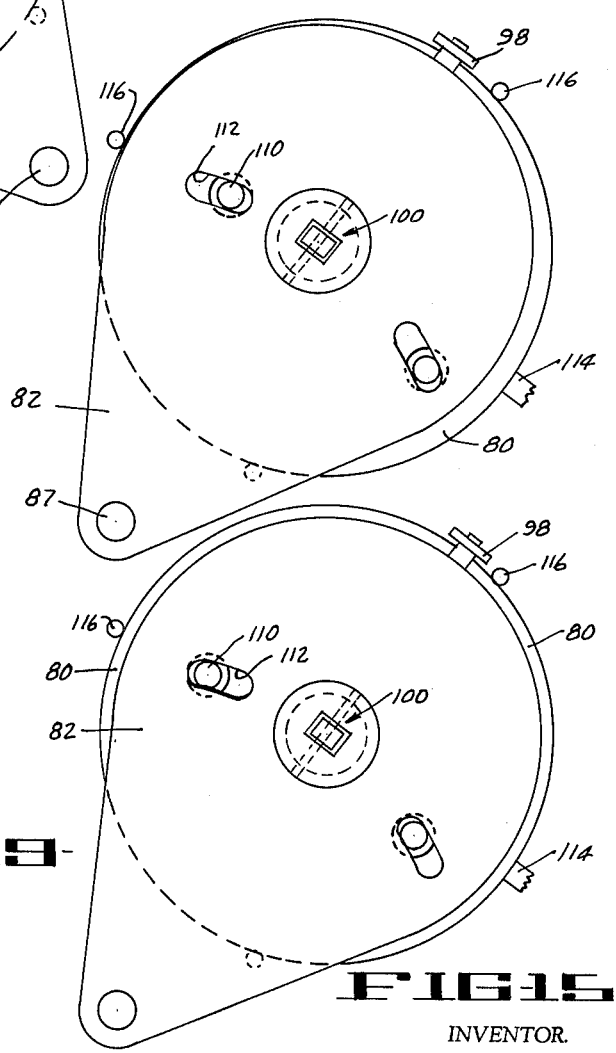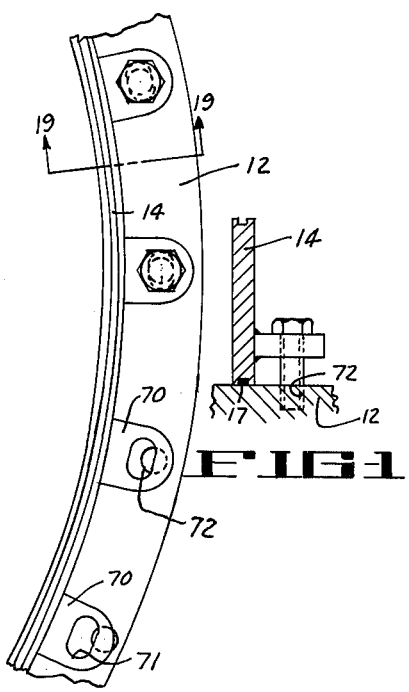

United States Patent Office 3,237,916
Patented Mar. 1, 1966

3,237,916
DISC VALVE
Austin U. Bryant, Walnut Creek, Calif., assignor to Grove Valve and Regulator Company, Oakland, Calif., a corporation of California
Filed Oct. 2, 1963, Ser. No. 313,357
15 Claims. (Cl. 251—158)

This invention relates to a disc valve and, more particularly, to a swinging disc type valve that is particularly adapted for installation in vacuum systems.

In a high vacuum system it is necessary that mechanisms which are directly exposed to the vacuum be operated in absence of lubrication since the lubricant molecules would be evacuated with other foreign particles. Consequently, valves which are employed in such a system may be subjected to a severe grating of finely ground seating surfaces and seal members if the valves are opened and closed with any relative sliding movement between the valve closure member and its complementary seat. As a consequence, many valves of the type ordinarily used in large flow passageways, such as gate valves, ball valves, butterfly valves and the like, are not conveniently used in vacuum systems because the rotational or pivotal movement of the valve closure member relative to the seat produces the prohibitive relative sliding and abrading action. Of course, there are numerous valves that are opened and closed by moving the valve closure member axially into and out of seating engagement but, in the case of large vacuum ducts, considerable movement of the valve closure member is required in order to provide relatively unimpeded full flow path access through the valve.

A further disadvantage that is experienced in the use in vacuum systems of gate valves or the like that move lineally into and out of seating position resides in the movement of a sliding shaft or screw into and out of the valve body and, hence, into and out of the vacuum to increase problems of evacuation and frequently to abrade the sliding shaft seals.

It is, therefore, an object of this invention to provide a valve that combines axial movement of the valve closure member for seating and unseating movement with lateral movement thereof to free the flow passage.

It is a further object of this invention to provide a valve that is rapidly operated between closed and full open positions in response to operation of a rotatable shaft journalled in the valve body.

It is a further object of this invention to provide a compact valve having a disc closure member that may be swung into and out of alignment with a flow passage and then, when in alignment with the flow passage, moved transversely for seating and unseating.

It is a further object of this invention to provide a disc valve that utilizes a single operating mechanism to swing a disc into and out of alignment with a flow passage and then to move the disc axially into and out of seating engagement.

It is a further object of this invention to provide a swinging disc valve that is economical to manufacture and simple and reliable to operate.

In carrying out this invention, I provide a valve disc carrier that is pivotally mounted within a valve body to swing in a plane parallel to a valve seat surrounding a flow passage. Supported on the disc carrier is a valve disc of a size and shape which, when engaging the valve seat, closes the flow passage. The mechanical connection between the valve disc and the disc carrier permits a limited amount of movement of the disc in a direction transverse to the plane in which the carrier swings and means are provided to operate this mechanical connection when, but only when the valve disc is in alignment with the flow passage. In one form of the invention, the mechanical connection between the disc carrier and the disc comprises a toggle linkage and a stop member on the valve body that engages the valve disc when it is moved into alignment with the flow passage so that further movement of the carrier drives the valve disc transversely into seating engagement. This seating engagement also produces an inter-engagement of members on the valve disc and valve body so that reverse swinging movement of the valve disc is prevented until initial movement of the disc carrier reverses the action of the toggle linkage and withdraws the disc transversely from the seat.

In the other form of the invention the connection between the disc and the carrier includes a threaded member that produces axial movement of the disc when it is rotated. In this arrangement, limited rotation of the threaded member is accomplished by means of a linkage that connects it to the valve operating mechanism. In conjunction with this linkage, there is provided a latch mechanism that locks it into a rigid connection between the operating mechanism and the valve disc carrier except when the valve disc is in alignment with the flow passage. Thus, in all other positions of the valve disc, motion of the operating member is transmitted directly to the carrier to swing it between its displaced and aligned positions. Once aligned with the flow passage, latch releasing means prevent further movement of the carrier but permit operation of the linkage so that further movement of the operating member causes the threaded element to move the valve disc transversely.

Other objects and advantages of this invention will become apparent from the more detailed descriptions following when read in conjunction with the accompanying drawings wherein:

FIG. 2 is a vertical section view of the valve of FIG. 1 showing the operating mechanism;

FIG. 3 is a partial section view enlarged of a portion of the operating mechanism shown in FIG. 2;

FIG. 4 is an enlarged partial section veiw of another form of operating mechanism;

FIG. 5 is a partial top view of the operating mechanism of FIG. 4;

FIGS. 6, 7 and 8 are more or less schematic views showing various stages of operation of the valve of FIG. 1;

FIG. 9 is a partial section view taken on line 9—9 of FIG. 1;

FIGS. 12, 13 and 14 are partial section views showing the operating mechanism of the FIG. 10 valve;

FIGS. 15, 16 and 17 are more or less schematic views showing the operation of the FIG. 10 valve;

FIG. 18 is an enlarged partial section view of a valve body construction; and

FIG. 19 is a section view taken along line 19—19 of FIG. 18.

Figure 1:
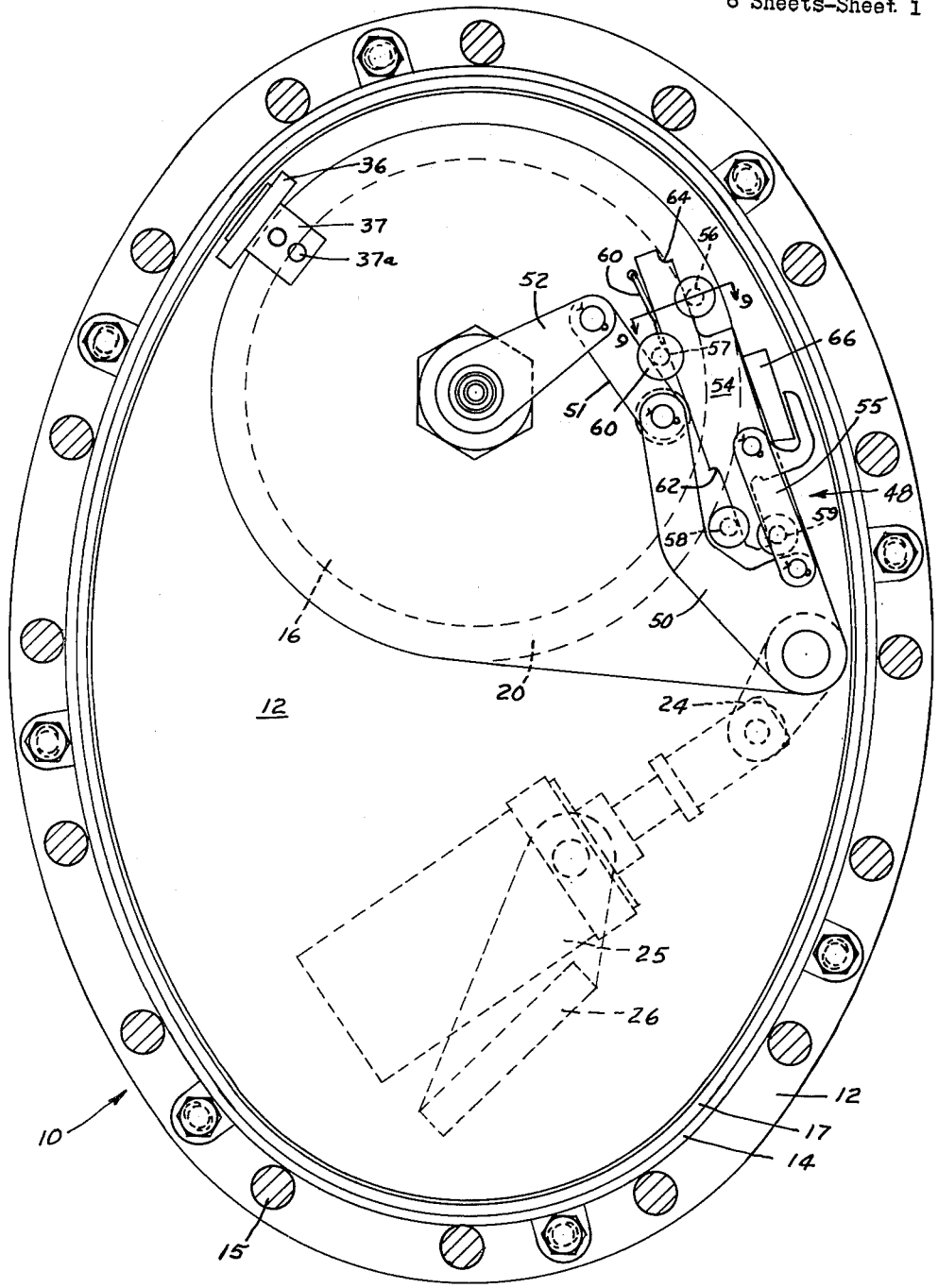
FIG. 1 is a horizontal section view of one form of swinging disc valve embodying features of this invention.

Referring now to the drawings in greater detail, the valve of this invention 10 is preferably of the sandwich-type construction having end plates 12 and 12a and an intermediate body band 14 against which the plates 12 are firmly secured by means of bolts 15 or the like. As shown in FIG. 1, the end plates may be of generally oval configuration and offset toward one end are aligned flow passage openings 16 and 16a (FIG. 2) which, when the valve plates are connected into a duct system are in alignment with suitable ducts (not shown). Preferably O-ring seals 17 or the like disposed around the body band 14 make the valve body fluid tight. Embracing one of the flow passages is a valve seating surface in which there is preferably accommodated a suitable resilient seal ring 18 conditioned to coact with the smoothly finished face of a valve closure disc 20 to seal off the flow passage 16. As previously discussed, when the valve is used in such vacuum systems, it is desirable that it be moved into and out of sealing engagement in a direction transverse to the seat to avoid any sliding, abrading action but thereafter to be moved parallel to the seat to provide full fluid flow when desired. The mechanism for achieving this action will now be described.

The valve closure disc is carried on the underside of a disc carrier member 22 which, in turn, is pivotally mounted in the valve body 10 to swing about a suitable axis parallel to the axis of the flow passage 16. For this purpose, the disc carrier member or arm 22 is rotatably carried on a shaft 23 which, in turn, is rotatably mounted in the valve body 10. The shaft 23 extends outside the valve body 10 through the bottom valve plate 12 where the lower end is secured to an operating arm 24. As shown in FIG. 1, the operating arm 24 may be rotated by any suitable means such as the operating cylinder 25 pivotally mounted on a bracket 26, to swing the carrier arm 22 from the solid line position shown in FIG. 1 (and in FIG. 6) to that shown in FIG. 8.

Referring to FIG. 2 specifically, the shaft 23 may be mounted in suitable bearings 27 carried in a packing seal 28 which is held on the end plate by a retainer cap 30. The packing seal preferably carries a pair of external seals 31 and a pair of internal seals 32 with suitable lubrication ducts 33 being provided to introduce a lubricant to the shaft 23 between the seals. Alternatively, the ducts 33 may be connected to an evacuation pump to provide an intermediate guard vacuum between the seals 31 and 32. A thrust bearing sleeve 34 supports the inner end of the carrier arm 22 in fixed axial position on the shaft and, hence, in a fixed spaced relationship with respect to the valve body end plate 12 and its seat seal 18. The operating arm 24 is keyed onto the lower end of the shaft 23 and the nut 35 is threaded onto the shaft to retain the operating arm axially.

A wheel or roller 36 is rotatably carried on a bracket 37 which is secured on the end of the carrier arm 22 as by means of cap screws 37a to facilitate swinging movement of the carrier arm 22. Additionally, since the wheel spans the valve body space with a small clearance between the end plates 12 to permit rolling, the wheel 36 retains the carrier arm 22 in a fixed plane relative to the end plates 12. Hence, the wheel 36 and the thrust sleeve 34 at the shaft 23 cooperate to retain the carrier arm 22 and valve disc 20 in fixed spaced relationship above the valve body end plate 12 throughout the swinging movement thereof previously described. Hence, there can be no scratching or grinding of the metal surfaces or cutting of the resilient seal 18. This is particularly significant when the valve is employed as a vacuum system wherein lubricants cannot be retained. Consequently, I also provide means for moving the valve disc 20 transversely into and out of seating engagement with the valve plate 20. This arrangement will now be described in detail.

In the mechanism detailed in FIGS. 2 and 3, a central stub shaft 38 projects upwardly from the top side of the valve disc 20 and is rotatably received within a motion-transmitting bearing member 40, with suitable anti-friction bearing 41 being provided to insure free rotational movement of the motion-transmitting member 40 on the valve disc shaft 38. A cap screw 42 engaging a thrust washer 43 locks the motion-transmitting member 40 against axial movement along the valve disc shaft 38 while, of course, permitting relative rotation through the bearings.

The motion-transmitting member 40 is provided with external threads 42 that engage complementary internal threads 44 in a sleeve 45 that is rigidly secured through the center of the disc carrier arm 22. As will be noted, the threads 42 and 44 are left handed so that when the motion-transmitting member 40 is rotated in a counterclockwise direction the threads operate to move it downwardly along the sleeve 45 and, because it is rotatable on the shaft 38, transverse lineal movement is imparted to the stub shaft and, hence, to the valve closure disc 20. The roller 36 that is secured to the carrier arm 22 insures that relative movement between the carrier arm 22 and the valve disc 20 is restricted to the disc 20 only.

Referring to FIGS. 1 and 2, the latch mechanism 48 that conditions the valve disc carrier 22 to swing across the valve body end plate or to move the valve disc axially into and out of seating engagement is shown in greater detail. A latch control arm 50 is welded or otherwise secured onto the upper end of the operating shaft 23 (FIG. 2) so that operation of the axial cylinder 25 pivots the latch control arm 50. The latch control arm is connected by a link 51 to an arm 52 extending from the top of motion-transmitting member 40 so that pivotal movement of the arm 50 can cause threading movement of the motion-transmitting member 40. However, in conjunction with the latch control arm 50, I provide a latch slide 54 which, while the valve disc 20 is moved out of engagement with the seat seal 18 surrounding the flow passage 16, is moved through link 55 to a position wherein it locks the latch control arm against movement relative to the valve disc carrier 22. Hence, in this condition, rotation of the shaft 23 in response to operation of the cylinder 25 causes the control arm 50 and the carrier 22 to move as a unit, thus producing the valve swinging movement.

Viewing FIGS. 1 and 6 to 9, the latch slide 54 is carried on the top of the carrier arm in a slideway formed by accommodating pins 56, 57, 58 and 59, each having an upper radial flange end over the top of the slide to confine it against transverse movement. A stop surface 62 toward one end of the slide engages the pin 58 to limit the sliding movement in one direction and a hook recess 64 at the free end of the slide is engageable behind the forward stop pin 56 to restrict movement in the opposite direction. A spring 60 urges the slide laterally against forward stop pin 56 so that when it moves downward to the position shown in FIG. 7 the recess stop 64 will engage behind the pin 56 so that the slide is locked against movement in either direction with engagement of both the stop surface 62 and the recess stop 64. Additionally, it will be noted in FIG. 7 that while the slide 54 is locked up, the link 55 passes between the pins 58 and 59 so that when the control arm 50 is rotated in a clockwise direction the slide 54 will tend to pivot about pin 59 and when it is rotated in a counterclockwise direction the slide 54 will tend to pivot about pin 58. In either case the pivotal movement thus imparted urges the slide firmly against forward stop pin 56 to aid the action of the spring 60.

Since at this time the linkage is locked against movement on the disc carrier, further pivotal movement of the latch control arm 50 is transmitted directly to the carrier arm 22 to swing the carrier from the position shown in FIGS. 1 and 6 to that shown in FIG. 8. This lockup is released when the carrier arm 22 is moved back into the active position shown in FIGS. 1 and 6 wherein the side of the latch slide 54 engages a latch release stop lug 66 that urges the slide laterally to the left in FIG. 1 against the spring 60 until the recess stop 64 is free of the pin 56 so that further movement of the operating arm 50 will operate through the link 51 and arm 52 to thread the motion-transmitting member 40 and drive the valve disc 20 against the valve seat. Proper seating of the valve disc is insured by the hook member 68 that engages the stop lug 66 as the slide 54 is released to lock the valve disc carrier 22 to the valve body.

Referring now to FIGS. 6, 7, and 8, the stages of operation of the swing disc valve will now be described.

Starting from the closed position shown more or less schematically in FIG. 6, when the pressure cylinder is actuated to swing the latch control arm counter-clockwise from the position shown, the link 51 swings the arm 52 through a clockwise arc of movement to rotate the left-hand threaded motion-transmitting member 40 (FIG. 3) and raise the stub shaft 38 and hence the valve disc 20; at the same time the link 55 pulls the latch slide 54 back, and, after the valve disc is unseated, the spring 60 urges the slide laterally until the recess stop 64 engages the pin 56 so that reverse threading movement of the member is prevented. At the same time, the stop surface 62 engages the lower pin 58 to prevent further threaded movement. At this time, as shown in FIG. 7, the hook 68 has released the stop lug 66 and the disc carrier 22 and valve disc 20 are free to swing clear of the flow passage 16.

With the slide 54 thus held against movement in either direction, the linkage is locked up and further pivotal movement of the latch control arm 50 is transmitted directly to the disc carrier plate 22 to swing the disc into the position shown in FIG. 8 leaving the flow passage 16 clear. Then, when it is desired to close the valve, the pressure cylinder is again actuated to move the actuator arm in a clockwise direction, and since the linkage 50, 51 is still locked to the disc carrier arm 22, the carrier arm is swung into the position shown in FIG. 7 until the stop lug 66 carried on the valve body, plate 12, engages the side of the slide 54 to push it against action of the spring 60 until the forward recess stop 64 is out of alignment with the pin 56. Thereafter, continued movement of the actuator arm permits movement of the slide 54 while the latch 68 engages the lug 66 to lock the disc carrier 22 on the valve body. With the slide 54 and latch control arm 50 free to move, the link 51 turns the threaded motion-transmitting member 40 (FIGS. 2 and 3) to force the seat disc 20 against the seat to the position shown in FIG. 6.

Referring now to FIG. 9, there is shown a preferred structural arrangement of the slideway pins 56 to 59. There, pin 56 has an enlarged body portion 56a, a top radial flange 56b, an intermediate portion 56c of reduced diameter and an enlarged bottom radial flange 56d. Thus, the pin may be inserted from the bottom through the hole 22a in the disc carrier 22 to the extent permitted by the bottom flange 56d. The the slide is inserted to engage between the enlarged portions 56a and 56b to lock the pin in place without threading or welding. This is particularly advantageous in a vacuum system because it avoids the occurrence of pockets that trap gasses and impede evacuation around welded or threaded connections.

A slight modification of the swing disc valve just described is the embodiment shown in FIGS. 4 and 5 wherein the acme thread of FIGS. 2 and 3 is replaced by a ball thread. Specifically, the motion-transmitting member 40a and sleeve 45a are provided with a complementary ball track groove 42a which are traversed by rolling ball 44a, so that the member 40a is threaded in relatively friction-free movement. Stop pins 46a are provided to limit the traversal of the balls 44a, and a helical wire spring member 47a may be provided to prevent displacement of the balls by gravity when there is no force on the motion-transmitting member 40a. The stop pins may be placed by drilling holes 46b from the outside of the sleeve 45a through to the opposite side thereof.

As shown in FIGS. 1 and 7, when the valve disc 20 is closed, the control arm 50 and the link 51 are stopped by the pin 57 at a point just past center so that any tendency of the linkage to slip or move from the position shown will produce an initial tightening movement of the motion transmitting member. This is particularly significant with the low friction, ball threaded member 40a of FIGS. 4 and 5.

A further feature of this invention is shown in FIGS. 1, 18 and 19, and relates to a structural arrangement for assembling the oval body band 14 in proper position on the valve plate 12. For this purpose a series of lugs 70 having slots 71 are welded around the periphery of the body band 14. Then, a series of threaded holes 72 is bored and tapped in the valve plate 12 along an oval line which is precisely concentric with the desired configuration of the body band 14. Consequently, in assembling the body band may be flexed until each slot is brought into alignment with a tapped hole and then a cap screw 74 is inserted and threaded into place to position the body band and to reinforce against both internal and external pressure differentials.

Referring now to FIGS. 10 through 16, I have shown a second basic form of the invention wherein a swing disc valve 80 is carried on a disc carrier member 82 to swing across a valve body and plate 84 between an active position aligned with a flow passage 85 leaving suitable seat seals 85a and an open position displaced therefrom. The valve body plates 84 and 84a may be of circular configuration with the flow passage located eccentrically to one side thereof leaving adequate room at the other side for the valve disc 80 when in open position. As in the previous construction, the valve body may be closed by a body band carrying seals 87 and secured between the end plates 84 and 84a by means of bolts 88 or the like.

In this embodiment the disc carrier 82 is fixed on the shaft 90 to which is also fixed an operating arm 92 connected to a pressure cylinder 93 mounted on the top body plate 84a. Thrust sleeves 95 and 96 carried on the shaft 90 and a roller 98 carried on the end of the disc carrier 82 function to keep the carrier in a fixed plane intermediate the end plates 84 and 84a, the roller further functioning to facilitate swinging movement of the carrier.

The particular connection between the valve disc carrier arm 82 and the valve disc 80 is shown more clearly in FIGS. 10 and 12 to 14, and comprises a toggle link arrangement 100 that tends to separate the disc and carrier in response to relative transverse movement between them. Specifically in this arrangement a link 102 is pivoted at the upper end to a block 105 on to the carrier arm 82 and at its lower end 106 to lugs secured to the top side of the valve disc 80. Suitable spring means 108 bias the toggle link 100 into the release position shown in FIG. 13 wherein the valve disc 80 is retained against the underside of the carrier arm 82 but, upon being pivoted to the position shown in FIG. 14 the valve disc 82 may be separated from the arm and into seating engagement.

Figure 10:
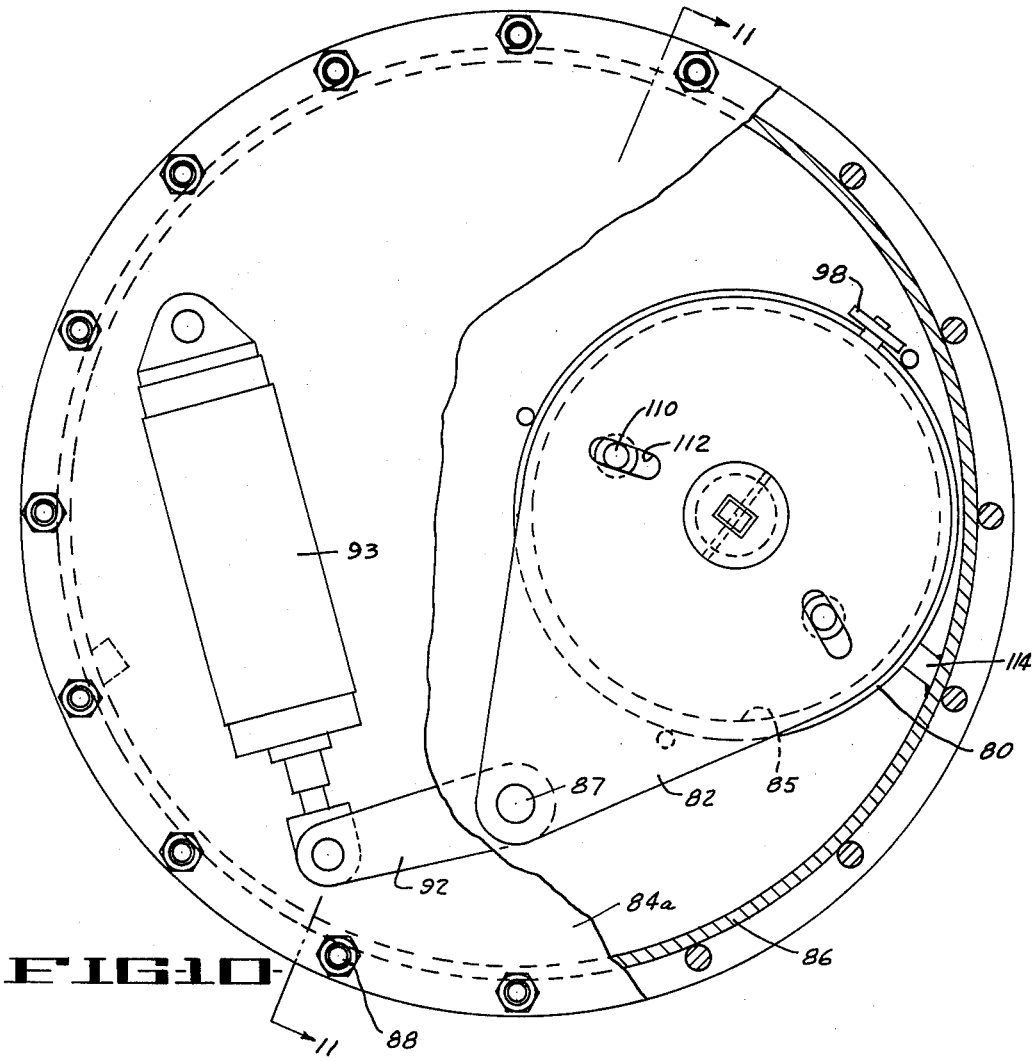
FIG. 10 is a top plan view partially in section showing a second form of swinging disc valve embodying features of this invention.
Figure 11:
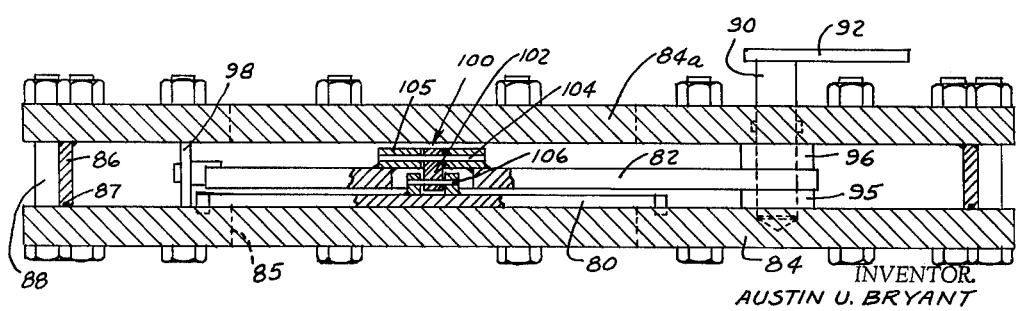
FIG. 11 is a section view taken along line 11—11 of FIG. 10.

As shown in FIG. 10, relative transverse movement of the carrier plate 82 and the disc 80 is guided by a series of pins 110 which extend upwardly from the top side of the valve disc to engage in slots 112 in the carrier plate so that the disc can move on the carrier plate about the center of the shaft 87 on which the carrier plate pivots. The toggle link 100 is operated during the pivotal movement of the carrier plate by holding the valve disc 80 against movement and for this purpose a stop lug 114 is secured to the valve body in the path of the valve disc but out of the path of the valve carrier arm. Hence, when the valve disc carrier is swung over the flow passage 85 to the position shown in FIG. 16, the stop lug 114 prevents further movement of the valve disc 80 so that further movement of the carrier plate 82 to the position shown in FIG. 15 will operate the toggle link 100 as shown on FIG. 14. For operation in the opposite direction a series of pins 116 are welded or otherwise secured at various points on the periphery of the closure disc and are adapted to engage in complementary holes 117 in the valve body end plate 84 when the disc is in its seated position shown in FIGS. 11, 12 and 14. The pins 116 are positioned on the valve closure disc so that none of them pass across the valve seat during swinging movement of the disc. Specifically, one pin may be positioned so that its entire travel occurs on one side of the seal ring and the other pins are located so that their arcs of travel do not intersect the seal ring.

In operation, the valve is closed by actuating the pressure cylinder 93 to move the arm 92 to the position shown in FIG. 10, whereby the disc carrier plate 82 will be swung to the right and into alignment with the flow passage. When the valve closure disc 80 is in alignment with the flow passage 85 it engages the stop lug 114 so that it can move no further. The carrier arm is, however, free to continue so that further operation of the pressure cylinder forces the toggle link to straighten out to the position shown in FIGS. 12 and 14 wherein the closure disc is driven down against the seat 85a. As previously described, the roller 98 carried on the disc carrier plate 82 is in engagement with the valve body and plates to prevent the carrier 82 from moving transversely thereto so that it is the valve disc only that moves transversely during operation of the toggle link 100. With the valve disc seated and the pins 116 engaged in the holes 117 in the valve body plate 84 the valve closure disc 80 is locked against transverse sliding movement against the valve seat. Consequently, when the pressure cylinder is reversed to swing the disc carrier plate back toward the left in FIG. 13 the closure disc is locked against movement and only the carrier plate may move to operate the toggle link 100 and return the closure disc to the position shown in FIGS. 13 and 16. Thereafter, the closure disc is free to move and continued operation of the pressure cylinder swings the closure disc free of the flow opening to the position as shown in FIG. 17.

While I have described my invention in connection with preferred embodiments thereof, it is apparent that modification and changes therein may be made by those skilled in the art without departing from the spirit and scope of this invention which is defined by the claims appended hereto.

Having described my invention, I claim:

1. A fluid flow control valve comprising:
   a valve body including a flow passage,
   a valve working surface on said body surrounding said flow passage,
   a closure carrier member pivotably mounted in said body to swing about an axis generally parallel to the axis of said flow passage,
   a valve closure member supported by said carrier and engageable with said valve working surface to close said flow passage,
   operating means for swinging said carrier between an active position wherein said closure member is in alignment with said flow passage and an open position displaced therefrom,
   means operated in response to said operating means while said carrier is in said active position to produce axial reciprocal movement of said closure member on said carrier into and out of engagement with said valve working surface, and
   complementary locking means on at least one of said members and on said valve body operative to secure said valve closure member against movement transverse of said working surface during at least that portion of said axial movement adjacent said valve working surface.

2. The fluid flow control valve defined in claim 1 wherein said means for producing axial reciprocal movement comprises:
   a toggle connection between said closure member and said carrier, and said complementary locking means comprises:
   a stop member on said valve body positioned to be engaged by said closure member when said closure member is moved into said active position whereby further swinging movement of said carrier operates said toggle linkage to force said closure member transversely into closed position against said valve working surface, and
   means on said closure member and valve body interengageable when said closure member is in closed position to prevent swinging movement of said closure member out of alignment with said flow passage until after retracting operation of said toggle linkage.

3. The fluid flow control valve defined by claim 1 wherein said means for producing axial reciprocal movement comprises:
   a motion-transmitting member operative in response to rotational movement thereof to produce lineal movement of said closure member on said carrier in a direction parallel to said axis,
   mechanism on said carrier connected between said operating means and said motion-transmitting member to produce said rotational motion,
   latch means to prevent operation of said mechanism whereby said mechanism forms a rigid connection between said operating means and said carrier, and
   latch release means for inactivating said latch means when said closure member is in said active position.

4. The fluid flow control valve defined by claim 3 wherein said latch means comprises:
   a slideway on said carrier,
   a slide member on said slideway,
   means limiting sliding movement of said slide member in one direction in said slideway, and
   linkage connecting said operating means to said slide so that when limited sliding movement of said slide is completed said rigid connection is formed.

5. The fluid flow control valve defined by claim 4 including:
   a lock member operative when said limited sliding movement is completed to hold said slide against movement in the opposite direction, and
   said complementary locking means are on said valve body and said slide member and are engaged when said limited sliding movement is completed.

6. The fluid flow control valve defined in claim 1 wherein said means for producing axial reciprocal movement comprises:
   a motion-transmitting member rotatably mounted on said closure member and threadedly engaged with said carrier to produce lineal movement of said closure member on said carrier in a direction parallel to said axis,
   mechanism on said carrier connected between said operating means and said motion-transmitting member to produce said rotational motion,
   latch means to prevent operation of said mechanism whereby said mechanism forms a rigid connection between said operating means and said carrier, and
   latch release means for inactivating said latch means when said closure member is in said active position.

7. The fluid flow control valve defined by claim 6 wherein said latch means comprises:
   a slideway on said carrier,
   a slide member on said slideway,
   means limiting sliding movement of said slide member in one direction in said slideway, and
   linkage connecting said operating means to said slide so that when limited sliding movement of said slide is completed said rigid connection is formed.

8. The fluid flow control valve defined by claim 7 including:
   a lock member operative when said limited sliding movement is completed to hold said slide against movement in the opposite direction, and
   said complementary locking means are on said valve body and said slide member and are engaged when said limited sliding movement is completed.

9. A fluid flow control valve comprising:
   a valve body including a flat surface having a flow passage therethrough,
   an annular valve seat on said flat surface surrounding said flow passage,
   a valve disc carrier member pivotably mounted on said body to swing about an axis generally parallel to the axis of said flow passage, a valve disc member supported by said carrier member and engageable with said valve seat to close said flow passage, operating means for swinging said carrier member between an active position wherein said valve disc is in alignment with said flow passage and an open position displaced therefrom, means holding said carrier member in a fixed plane displaced from said flat surface during said swinging movement, and means operated in response to said operating means while said valve disc is in said active position to produce axial reciprocal movement of said valve disc relative to said carrier member into and out of engagement with said valve seat, and complementary locking means on at least one of said members and on said valve body to secure said valve closure member against movement transverse of said working surface during at least that portion of said axial movement adjacent said valve working surface.

10. The fluid flow control valve defined in claim 9 wherein said means for producing axial reciprocal movement comprises:

a toggle connection between said valve disc and said carrier member, and said complementary locking means comprises:

a stop lug fixed on said valve body and positioned to be engaged by said valve disc when said valve disc is moved into said active position whereby further swinging movement of said carrier member operates said toggle linkage to force said valve disc transversely against said valve seat, and complementary means on said valve disc and said valve body inter-engageable when said valve disc is seated to prevent swinging movement of said valve disc out of alignment with said flow passage until after retracting operation of said toggle linkage.

11. The fluid flow control valve defined by claim 10 wherein said complementary means comprises:

at least one pin extending transversely from said valve disc toward said flat surface, and an accommodating recess in said flat surface aligned with said pin when said disc is in said active position.

12. The fluid flow control valve defined in claim 9 wherein said means for producing axial reciprocal movement, comprises:

a motion-transmitting member connected between said valve disc and said carrier member and operative in response to rotational movement thereof to produce lineal movement of said valve disc on said carrier member in a direction parallel to said axis, mechanism on said carrier member connected between said operating means and said motion-transmitting member to produce said rotational motion, latch means to prevent operation of said mechanism whereby said mechanism forms a rigid connection between said operating means and said carrier member, and latch release means for inactivating said latch means when said valve disc is in said active position.

13. The fluid flow control valve defined by claim 12 wherein said latch means comprises:

a slideway on said carrier arm, a slide member on said slideway, means limiting sliding movement of said slide member in one direction in said slideway, and linkage connecting said operating means to said slide so that when limited sliding movement of said slide is completed said rigid connection is formed.

14. The fluid flow control valve defined by claim 13 including:

a lock member operative when said limited sliding movement is completed to hold slide against movement in the opposite direction, and said complementary locking means are on said valve body and said slide and are engaged when said limited sliding movement is completed.

15. A fluid flow control valve comprising:

a valve body including a wall having a flow passage therethrough, an annular planar valve seat on said wall surrounding said flow passage, a valve disc carrier member mounted on said body for movement generally parallel to said valve seat, a valve disc member supported by said carrier member engageable with said valve seat to close said flow passage, operating means for producing said movement of the carrier member between an active position wherein said valve disc is in alignment with said flow passage and an open position displaced therefrom, means constraining said carrier member to move in a fixed plane displaced from the plane of said valve seat during said transverse movement, means operated in response to said operating means while said valve disc is in said active position to produce axial reciprocal movement of said valve disc relative to said carrier member into and out of engagement with said valve seat, and complementary locking means on one of said members and on said valve body to secure said valve closure member against movement transverse of said working surface during at least that portion of said axial movement adjacent said valve working surface.

References Cited by the Examiner

UNITED STATES PATENTS

| 241,568 | 5/1881 | Spratt | 251—158 X |
|---|---|---|---|
| 1,219,392 | 3/1917 | Hagen | 251—158 |
| 2,850,260 | 9/1958 | Perazone | 251—203 X |

FOREIGN PATENTS 350,287    3/1922    Germany.

ISADOR WEIL, *Primary Examiner.*

M. CARY NELSON, *Examiner.*